(12) United States Patent
Sasai et al.

(10) Patent No.: US 6,193,495 B1
(45) Date of Patent: Feb. 27, 2001

(54) CONNECTOR MOLD AND A CONNECTOR MOLDING METHOD

(75) Inventors: Osamu Sasai; Izumi Suzuki, both of Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 09/301,219

(22) Filed: Apr. 28, 1999

(30) Foreign Application Priority Data

Apr. 28, 1998 (JP) .................................................. 10-118513

(51) Int. Cl.[7] ...................................................... B28B 17/00
(52) U.S. Cl. ........................... 425/190; 425/183; 425/574; 249/102
(58) Field of Search ............................. 425/577, 183, 425/574, 190, 470; 249/102

(56) References Cited

U.S. PATENT DOCUMENTS

| | | | |
|---|---|---|---|
| 5,660,782 | 8/1997 | Davis | 264/297.2 |
| 5,709,831 | * 1/1998 | Endo et al. | 264/238 |
| 5,814,356 | * 9/1998 | Ito et al. | 425/556 |
| 5,861,120 | * 1/1999 | Yagi et al. | 264/255 |
| 5,915,760 | * 6/1999 | Kawase et al. | 29/883 |
| 6,024,552 | * 2/2000 | Wada et al. | 425/130 |
| 6,045,739 | * 4/2000 | Abe | 264/277 |

FOREIGN PATENT DOCUMENTS

| | | |
|---|---|---|
| 0 349 460 | 1/1990 | (EP) . |
| 2 233 596 | 1/1991 | (GB) . |
| 2 303 817 | 3/1997 | (GB) . |
| 60-152272 | 10/1985 | (JP) . |
| 61-211010 | 9/1986 | (JP) . |
| 5-41257 | 2/1993 | (JP) . |
| 6-35400 | 9/1994 | (JP) . |

* cited by examiner

Primary Examiner—Harold Pyon
Assistant Examiner—Emmanuel S. Luk
(74) Attorney, Agent, or Firm—Anthony J. Casella; Gerald E. Hespos; Michael J. Porco

(57) ABSTRACT

A connector mold is provided to improve connector molding efficiency. Thus, a first insert 30 for a first male connector 10 and a second insert 31 for a second male connector 15 can be exchangeably mounted in a movable mold 22. A first closing projection 32 fittable into a second identification rib forming groove 26 of a fixed mold 21 projects from the front surface of the first insert 30, and a first preventing rib forming groove 33 for forming an error assembling preventing rib 13 of the first connector 10 extends on the upper surface of the first insert 30 on an extension line of a first identification rib forming groove 25 of the fixed mold 21. When the molds 21, 22 are closed, a closed connector molding space 20A is defined therebetween and the first closing projection 32 closes the second identification rib forming groove 26.

6 Claims, 11 Drawing Sheets

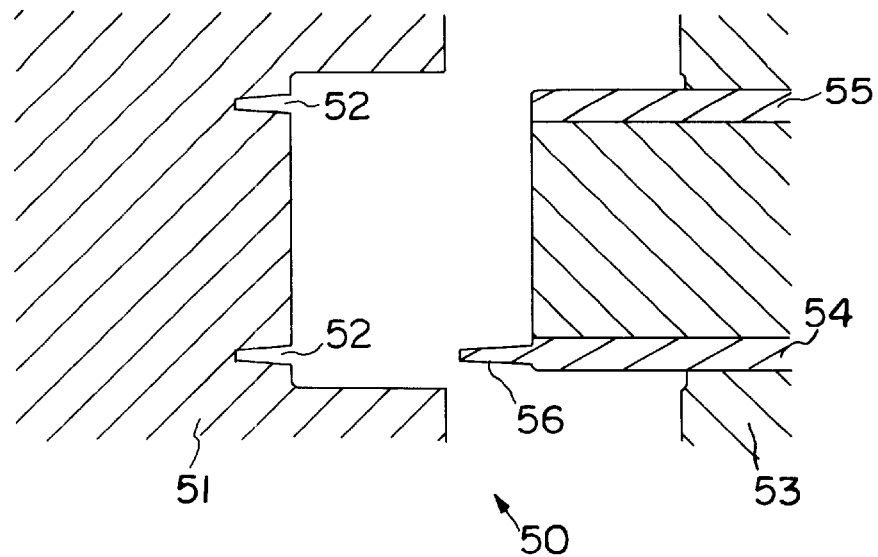
F I G. 9(A)
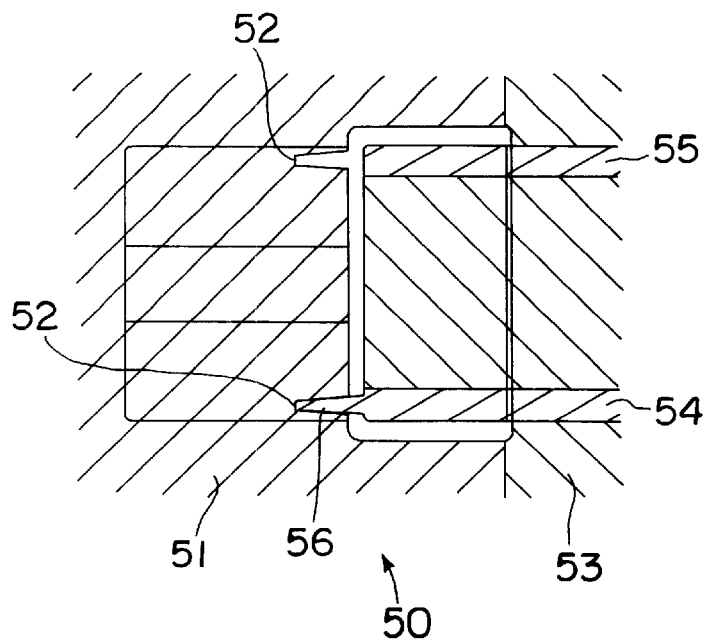
F I G. 9(B)

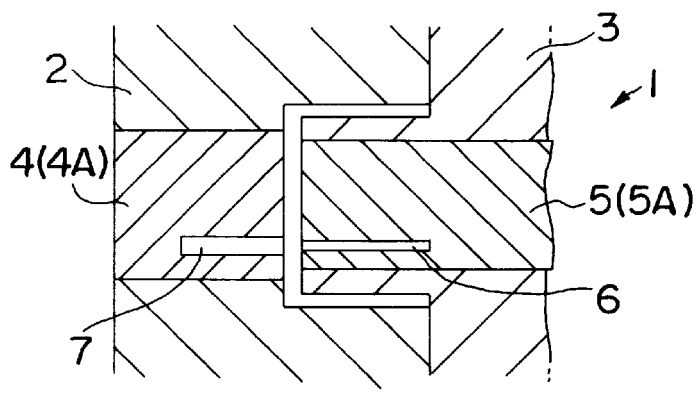
F I G. 11(B)
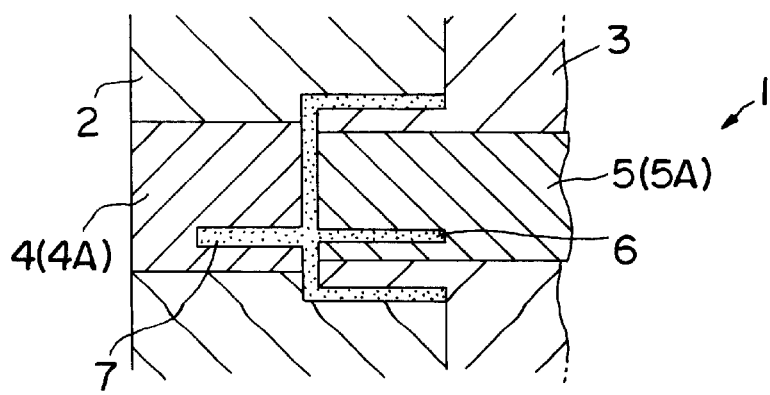
F I G. 11(C)

CONNECTOR MOLD AND A CONNECTOR MOLDING METHOD

BACKGROUND OF THE INVENTION

1. Field of the Invention

The present invention relates to a connector mold capable of molding a plurality of kinds of connectors by exchanging inserts and to a connector molding method for molding a plurality of kinds of connectors by exchanging inserts.

2. Description of the Related Art

A first male connector 10 shown in FIG. 10A and a second male connector 15 shown in FIG. 10B are the subject of copending Appl. No. 09/300,504. The connectors 10, 15 have a common basic construction which is comprised of a housing main body 11 and a receptacle 12. Each prior art connector 10 and 15 further has a rib 13 formed on the inner surface of the receptacle 12 for preventing an assembling error, and a rib 14 formed on the outer surfaces of the housing body 11 for identifying the connectors 10 and 15. However the ribs 13 and 14 are different on the respective connectors 10 and 15. Specifically, in the first prior art male connector 10, the ribs 13, 14 are aligned toward the left when viewed from the front of the connector 10. In the second prior art male connector 15, the ribs 13, 14 are aligned toward the right.

Female connectors 16, 17 can mate with male connectors 10, 15. The female connectors 16, 17 have grooves 18 formed in positions to receive corresponding ribs 13 in the receptacle 12 of the male connectors 15. Thus the male and female connectors cannot be connected unless properly combined. More particularly, ribs 13 on the inner surface of a receptacle 12 of a male connector 10, 15 prevent assembling the male connectors 10, 15 with wrong female connectors 16, 17. The ribs 14 which are provided exteriorly on the housing main bodies 11 of male connectors 10, 15 are for identifying the male connectors 10, 15 during a testing procedure. A corresponding electrical test set is generally provided with a corresponding groove which helps to separate connectors to be measured from other types of connectors.

One possible connector mold 1 for forming the first and second male connectors 10, 15 is shown in FIGS. 11 and 12 and employs conventional mold manufacturing theories. This connector mold 1 is comprised of a pair of openable mold main bodies 2, 3, and can form two kinds of connectors 10, 15 by exchanging inserts 4, 5 in the mold main bodies 2, 3. In the case of forming the first male connector 10, an insert 5A having a groove 6 for forming the error assembling preventing rib 13 formed in its position toward the bottom in FIG. 11 is assembled into one mold main body 3 shown at the right side of FIG. 11. An insert 4A having a groove 7 for forming the identification rib 14 formed in its position toward the bottom in FIG. 11 is assembled into the other mold main body 2. Then, resin is injected into the mold. In the case of molding the second male connector 15, an insert 5B formed with the groove 6 and an insert 4B formed with the groove 7 are assembled, as shown in FIG. 12 in the respective mold main bodies 2, 3 in positions toward the top of FIG. 12 and resin is injected into the mold.

Since the conventionally designed connector mold 1 is such that the inserts 4, 5 are separately assembled into the respective mold main bodies 2, 3, there is an undesirable likelihood that a connector having a wrong mode in which the ribs 13, 14 do not correspond to each other may be formed by, for example, mistakenly assembling the inserts 4B, 5A. Further, a long time is required to make a confirmation when the inserts 4, 5 are assembled into the mold main bodies 2, 3 in order to avoid such a situation, resulting in a poor connector molding efficiency.

In view of the above problem, an object of the present invention is to provide a connector mold and a connector molding method capable of improving a connector molding efficiency.

SUMMARY OF THE INVENTION

According to the invention, there is provided a connector mold capable of molding a plurality of kinds of connectors. Each connector has a receptacle and an error assembling preventing portion provided in the receptacle. Selected error assembling preventing portions have different shapes or locations than others for making the connection with a mating connector impossible unless the connectors are properly combined. An identification projection is arranged on the outer surface of the connector at a location selected in accordance with the location of the error assembling preventing portion. The connectors are formed by a pair of mold main bodies and a selected one of a plurality of inserts. The insert is provided in only one of the mold main bodies, and is configured for the selected error assembling preventing portion. A plurality of recesses for forming identification projections of all kinds of connectors planned to be molded are formed on a surface of the other mold main body that faces the insert. The insert is provided with closing projections for closing all of the recesses except for the one for forming the identification projection that corresponds to the selected error assembling preventing portion to be formed by the insert.

Accordingly, the error assembling preventing portion is formed in the connector by the insert mounted in the one mold main body. Unnecessary recesses in the other mold main body are closed by the closing projections on the insert. Thus the identification projection corresponding to the error assembling preventing portion is formed in the connector by the remaining recess that has not been closed.

Since the insert is exchangeably mounted in only one mold main body in the present invention, there is no likelihood that a combination of inserts in the two mold main bodies is mistaken as with the prior art connector mold. Therefore, the insert assembling operation is simplified and the connector can be molded with improved efficiency.

According to a preferred embodiment, the identification projection of the connector is a rib on the outer surface of the connector at a location behind the receptacle. Additionally, the identification projection rib is on an extension line of the error assembling preventing portion provided in the inner surface of the receptacle. The insert is provided with a rib or groove for forming the error assembling preventing portion. The recess for forming the identification projection that corresponds to the rib or groove for forming the error assembling preventing portion is arranged on an extension line of the rib or groove in the other mold main body. The remaining recesses in the other mold main body are to be substantially closed by the closing projections provided on the insert.

Accordingly, since the recess for forming the identification projection is arranged on the extension line of the rib or groove for forming the error assembling preventing portion, the recesses for forming the identification projections can be closed only by extending the closing projections from the insert. As a result, the insert is allowed to have a small lateral dimension.

According to the invention, there is further provided a connector molding method for molding a plurality of kinds of connectors. The connectors have error assembling preventing portions that are of different shapes or arrangements provided in receptacles of each connector. Thus the error assembling preventing portion makes the connection with a mating connector impossible unless properly combined. An identification projection is arranged on the outer surface of the connector in accordance with the error assembling preventing portion. The method comprises exchangeably providing a plurality of kinds of inserts in a pair of mold main bodies for molding a connector provided with a receptacle. The method proceeds by arranging the insert in only one of the mold main bodies. The method continues by forming a plurality of recesses for forming identification projections of all kinds of connectors planned to be molded. The recesses preferably are formed on a face of the other mold main body facing the insert. The method proceeds further by providing the insert with closing projections for closing the recesses except the one for forming the identification projection corresponding to the error assembling preventing portion to be formed by the insert. The method then joins the mold main bodies to form a substantially closed connector molding space. Molding is carried out by injecting resin into the connector molding space, thereby molding the connectors having the respective error assembling preventing portion and identification projection, and taking the connector out of the mold main bodies.

These and other objects, features and advantages of the present invention will become more apparent upon a reading of the following detailed description and accompanying drawings.

BRIEF DESCRIPTION OF THE DRAWINGS

FIGS. 9(A) and 9(B) are plan views in section showing opened and closed states of a connector mold, respectively.

FIGS. 11(A), 11(B) and 11(C) are plan views in section showing an opened state of a prior art connector mold, a closed state thereof, and a state where resin is injected into the prior art connector mold, respectively.

DETAILED DESCRIPTION OF THE PREFERRED EMBODIMENT

Figure 1:
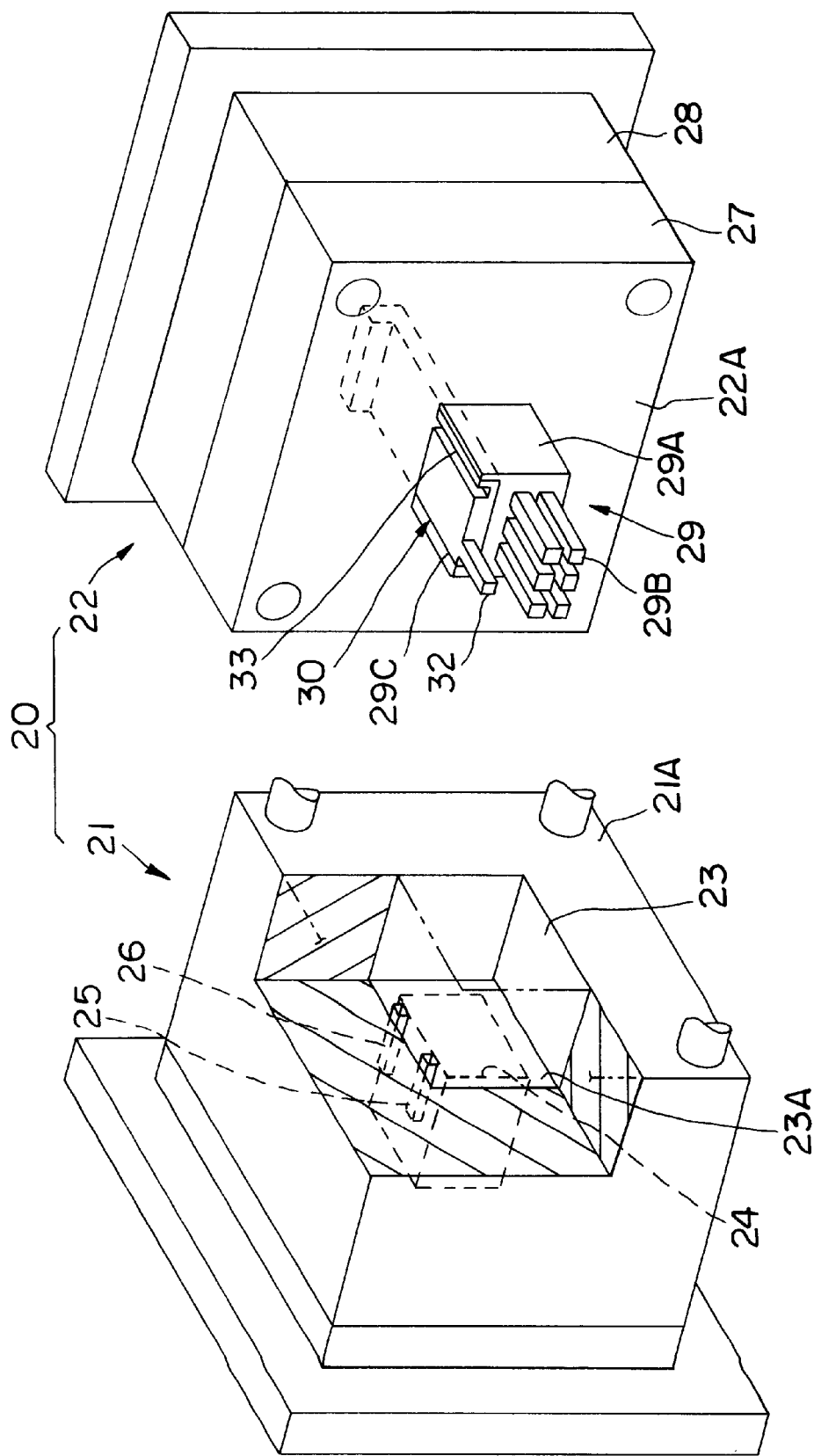
FIG. 1 is a perspective view of a connector mold according to a first embodiment of the invention.

A first embodiment of the invention is described with reference to FIGS. 1 to 5 and 10. In this embodiment, the invention is applied to a connector mold for molding first and second male connectors 10, 15, as described above with respect to the prior art.

A connector mold 20 according to this embodiment is comprised of a fixed mold 21 and a movable mold 22 which correspond to a pair of mold main bodies. The molds 21, 22 are moved toward and away from each other by sliding the movable mold 22 shown at the right side of FIG. 1, thereby substantially closing and opening the connector mold 20.

In the fixed mold 21, a receptacle recess 23 for forming the outer surfaces of the receptacles 12 of the connectors 10, 15 is so formed as to be open in the front surface of the fixed mold 21, and a main body recess 24 for forming the outer surfaces of housing main bodies 11 of the connectors 10, 15 are so formed as to be open in a back surface 23A. By the two recesses 23, 24, the outer configuration of the connector common to the connectors 10, 15 is substantially defined.

The ceiling surface of the main body recess 24 of the fixed mold 21 has first and second identification rib forming grooves 25, 26 that extend substantially in parallel along the opening and closing directions of the mold 20. One end of each of the grooves 25, 26 is open in the back surface 23A of the receptacle recess 23. The groove 25 is arranged on the left side when viewed from the front surface of the fixed mold 21 in FIG. 1 and is adapted to form an identification rib 14 of the first male connector 10. The groove 26 is arranged on the right side when viewed from the front surface of the fixed mold 21 in FIG. 1 and is adapted to form an identification rib 14 of the second male connector 15.

On the other hand, a molding projection 29 projects from the front surface of the movable mold 22 toward the fixed mold 21. The molding projection 29 is constructed such that a plurality of cavity forming portions 29B project from an end surface of a main body 29A for defining the inner surfaces of the receptacle 12. This molding projection 29 enters the receptacle recess 23 and the main body recess 24 through the openings thereof to define the inner configuration of the connector common to the first and second male connectors 10, 15.

The movable mold 22 is formed with an insert mount portion 29C in which a first insert 30 for the first male connector 10 and a second insert 31 for the second male connector 15 are selectively mounted. At a front end of the movable mold 22 is a detachable detachment base 27. The insert mount portion 29C penetrates the detachment base 27. The insert mount portion 29C is preferably a recess which extends substantially along the upper surface of the main body 29A of the molding projection 29 and is open in the upper and front surfaces of the main body 29A. The inserts 30, 31 are inserted or insertable from the rear side of the detachment base 27 to be assembled, and are substantially flush or aligned with the upper and front end surfaces of the main body 29A of the molding projection 29 (see FIG. 1).

A first closing projection 32 fittable into the second identification rib forming groove 26 of the fixed mold 21 projects from the front surface of the first insert 30 as shown in FIG. 1. This first closing projection 32 has such a length as to substantially reach the back surface of the groove 26 when the mold 20 is closed (see FIG. 2(B)). In the upper surface of the first insert 30, a first preventing rib forming groove 33 for forming an error assembling preventing rib is formed on an extension line of the first identification rib forming groove 25.

On the other hand, as shown in FIG. 5, a second closing projection 34 fittable into the first identification rib forming groove 25 of the fixed mold 21 projects from the front surface of the second insert 31. In the upper surface of the second insert 31, a second preventing rib forming groove 35 is formed on an extension line of the second identification rib forming groove 26 of the fixed mold 21. The second closing projection 34 and the second preventing rib forming groove 35 have substantially the same shapes as the first closing projection 32 and the first preventing rib forming groove 33 of the first insert 30.

Next, the action and effects of the embodiment constructed as above are described with reference to a molding method as a preferred embodiment of the invention.

Figure 2A:
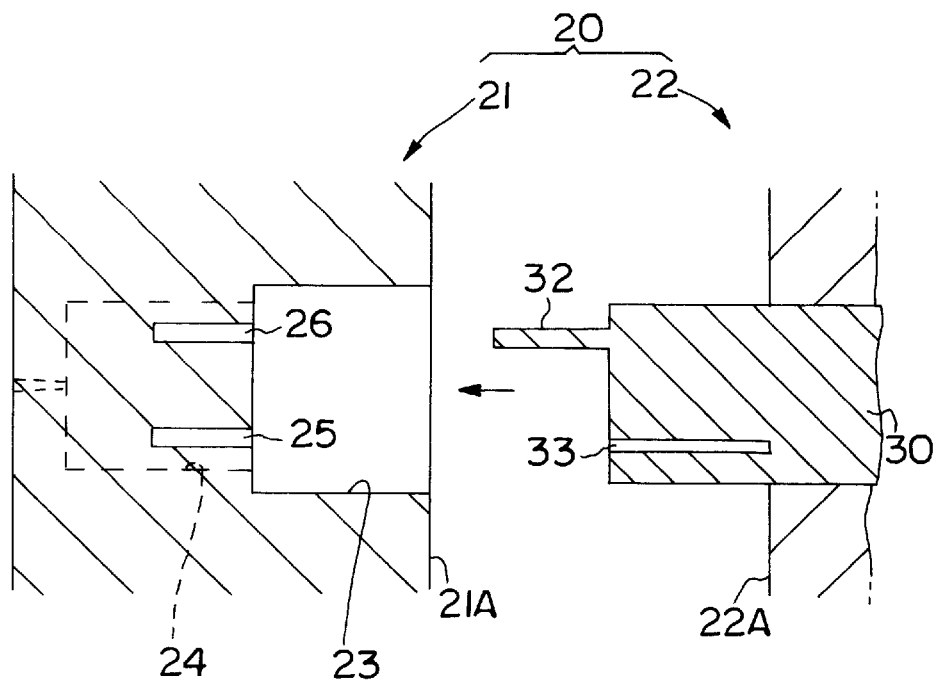
FIGS. 2(A) and 2(B) are plan views in section showing opened and closed states of the connector mold, respectively.
Figure 2B:
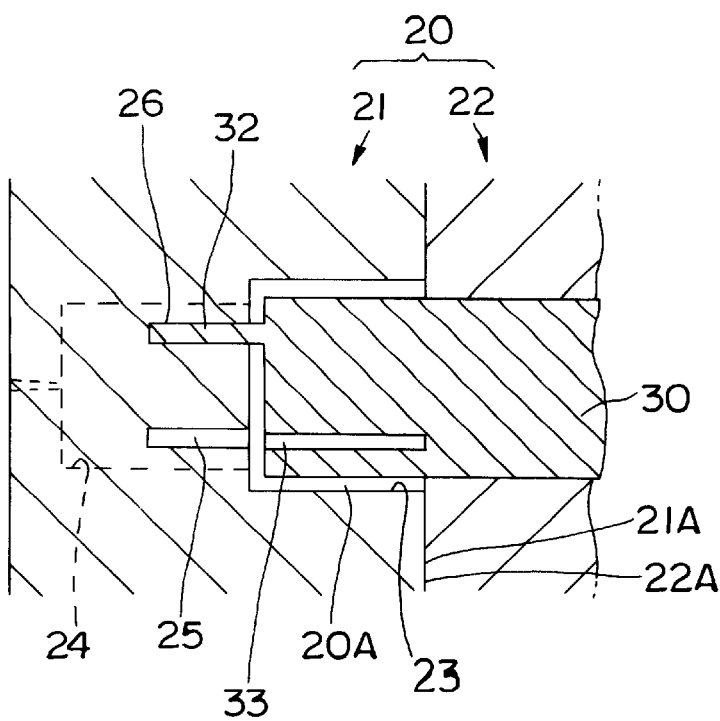

The first male connector 10 is molded by moving the movable mold 22 toward the fixed mold 21 after the first insert 30 has been mounted on the movable mold 22 as shown in FIG. 2(A). Then, the molding projection 29 of the movable mold 22 enters the receptacle recess 23 and the main body recess 24 of the fixed mold 21. Simultaneously, the first closing projection 32 of the first insert 30 mounted on the movable mold 22 is fitted into the second identification rib forming groove 26 formed in the fixed mold 21. When the front surfaces 21A, 22A of the two molds 21, 22 are joined, a closed connector molding space 20A is defined between the molds 21, 22 and the first closing projection 32 reaches the back of the second identification rib forming groove 26, thereby closing the groove 26.

Figure 3:
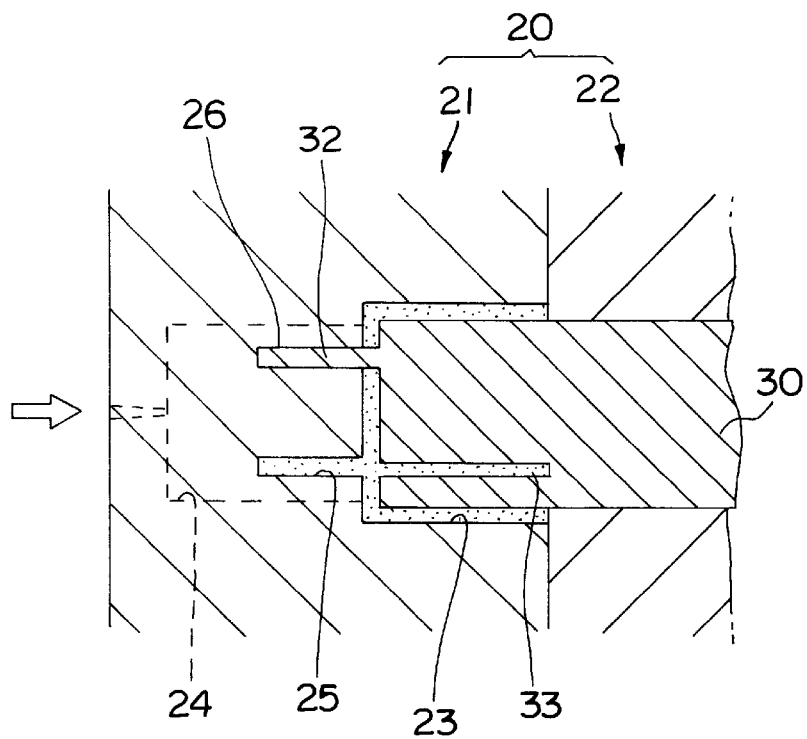
FIG. 3 is a plan view in section showing a state where resin is injected into the connector mold.

Subsequently, a synthetic resin is injected into the connector molding space 20A from the side of the fixed mold 21. Then, as shown in FIG. 3, the resin flows into the first identification rib forming groove 25 formed in the fixed mold 21 and the first preventing rib forming groove 33 formed in the first insert 30 of the movable mold 22, thereby forming the identification rib 14 and the error assembling preventing rib 13 at the left side of the upper surface of the connector when viewed from front. Since the second identification rib forming groove 26 of the fixed mold 21 is closed by the first closing projection 32, a right side of the upper surface of the connector, when viewed from the front, is formed flat. The molding of the first male connector 10 is completed by opening the connector mold 20 and taking the connector out of the connector mold 20.

Figure 4:
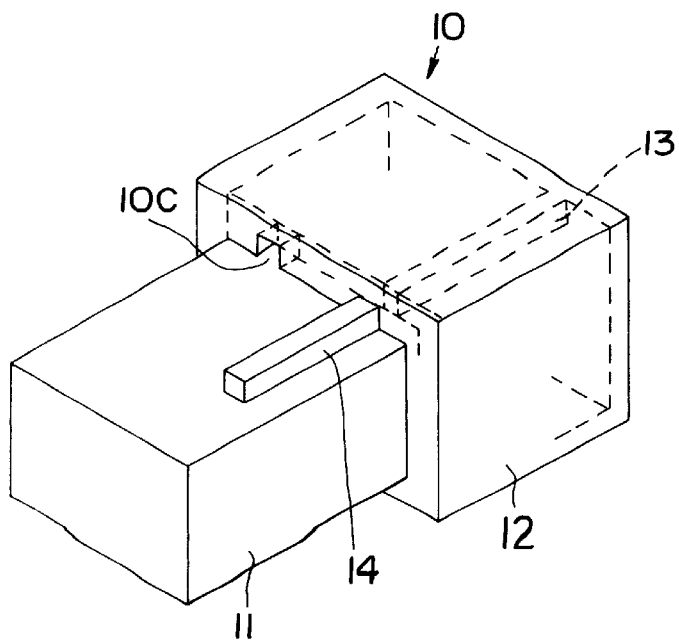
FIG. 4 is a perspective view of a first male connector.

In the connector 10 molded by this connector mold 20, a through hole 10C is formed in the rear end wall of the receptacle 12 by the first closing projection 32 as shown in FIG. 4.

Figure 5A:
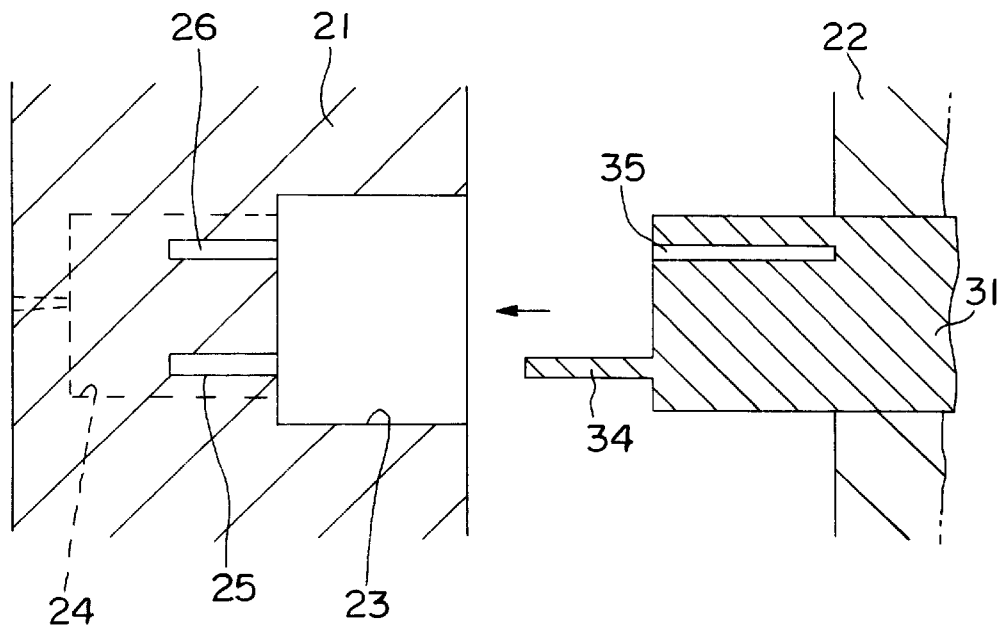
FIG. 5(A) and 5(B) are plan views in section of the connector mold having another insert mounted.
Figure 5B:
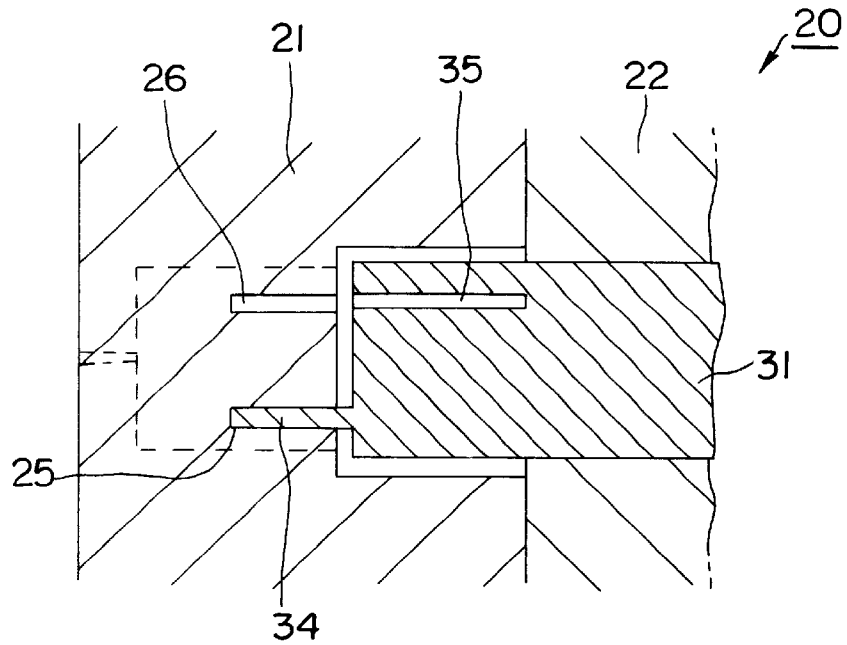

On the other hand, to form the second male connector 15, the detachment base 27 of the movable mold 22 is detached, the first insert 30 is replaced by the second insert 31, and the detachment base 27 is mounted again (see FIG. 5(A)). When the molds 21, 22 are closed, the first identification rib forming groove 25 of the fixed mold 21 is closed by the second closing projection 34 of the second insert 31 as shown in FIG. 5(B). Subsequently, when a synthetic resin is injected into the mold 20, the resin flows into the second identification rib forming groove 26 formed in the fixed mold 21 and the second preventing rib forming groove 35 formed in the second insert 31 of the movable mold 22, thereby forming the identification rib 14 and the error assembling preventing rib 13 at the right side of the upper surface of the connector when viewed from front. The right side of the upper surface of the connector, when viewed from the front, is formed flat. The molding of the second male connector 15 is completed by taking the connector out of the connector mold 20.

As described above, according to the invention, only one mold main body (movable mold 22) is so constructed that the inserts 30, 31 can be exchangeably mounted. Accordingly, unlike prior art connector molds, there is no likelihood that the inserts in the two mold main bodies are mistakenly combined. This makes the mounting of inserts easier and improves a connector molding efficiency. Further, since the preventing rib forming grooves 33, 35 are arranged on the extension lines of the identification rib forming grooves 25, 26, the grooves 25, 26 can be closed only by extending the closing projections 32, 34 from the inserts 30, 31, and the inserts 30, 31 are allowed to have a shorter lateral dimension.

Figure 6:
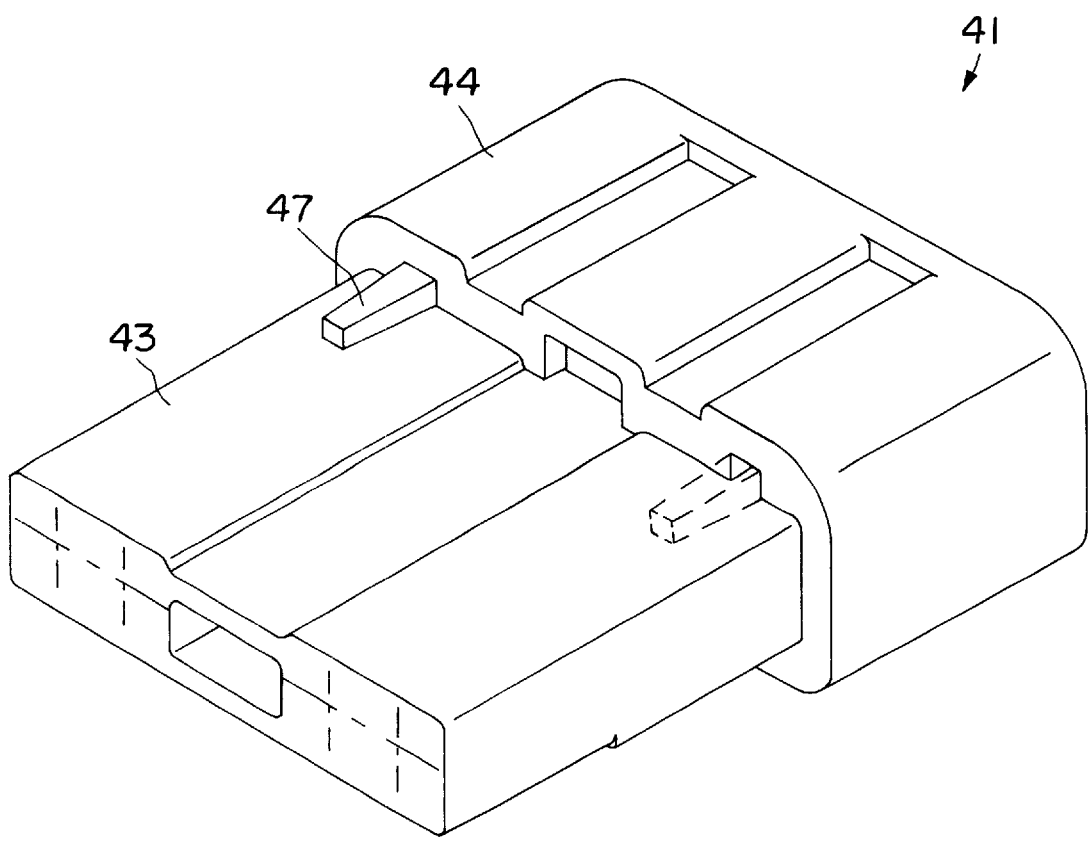
FIG. 6 is a perspective view of a male connector according to a second embodiment.
Figure 7A:
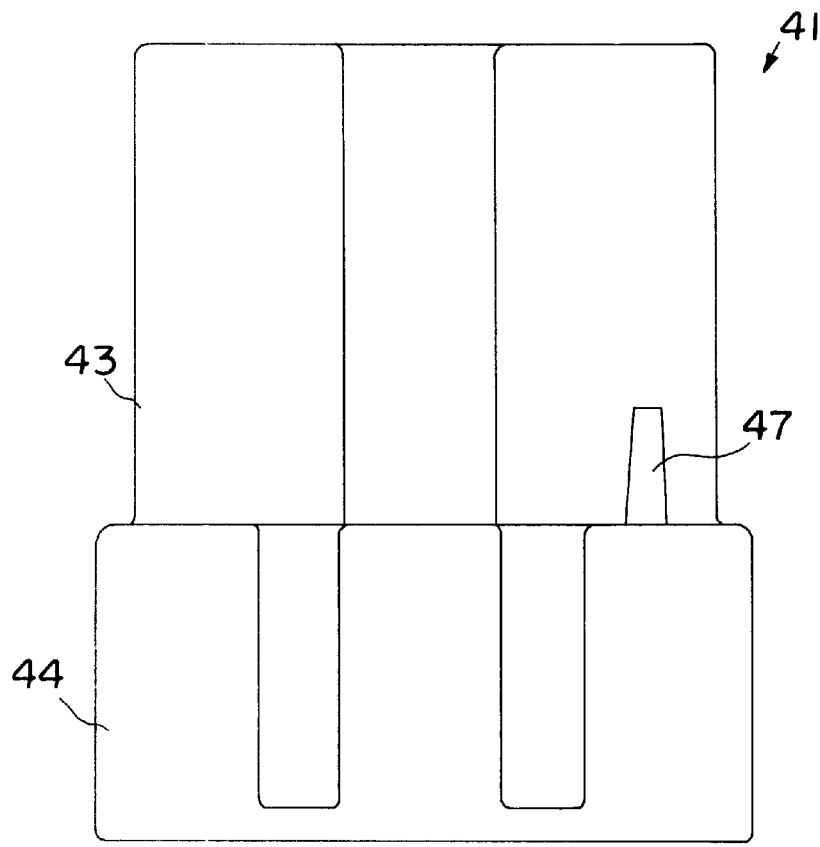
FIGS. 7(A) and 7(B) are plan and front views of a first male connector, respectively.
Figure 7B:
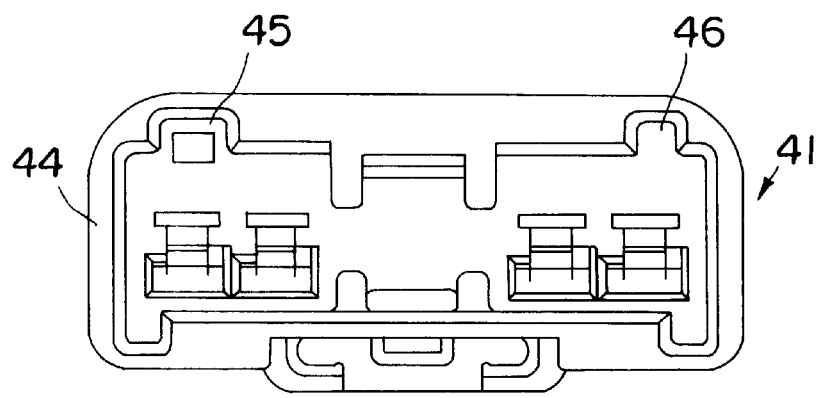
Figure 8A:
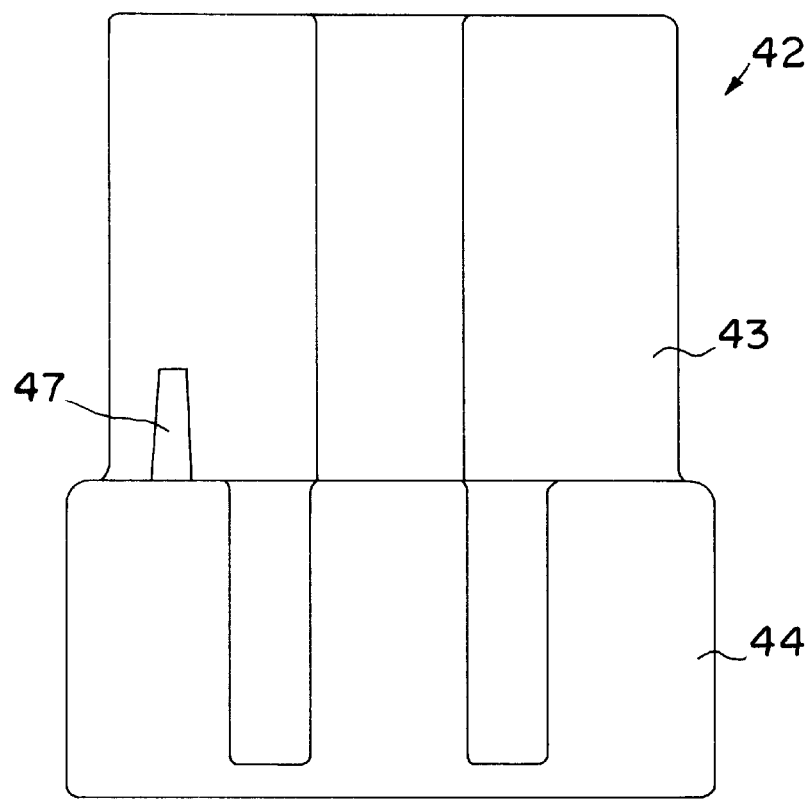
FIGS. 8(A) and 8(B) are plan and front views of a second male connector, respectively.
Figure 8B:
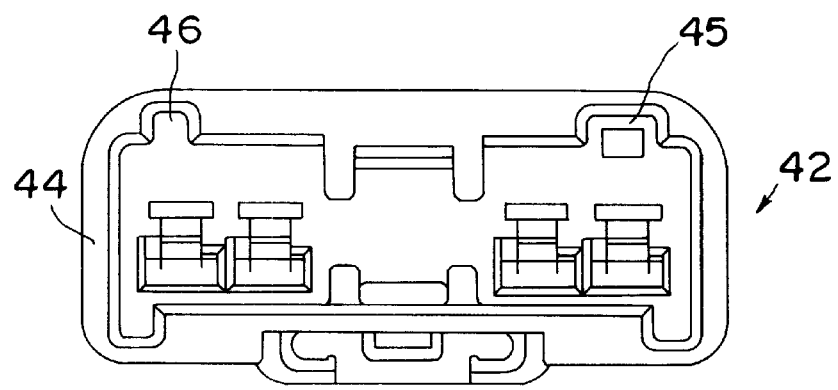
Figure 10A:
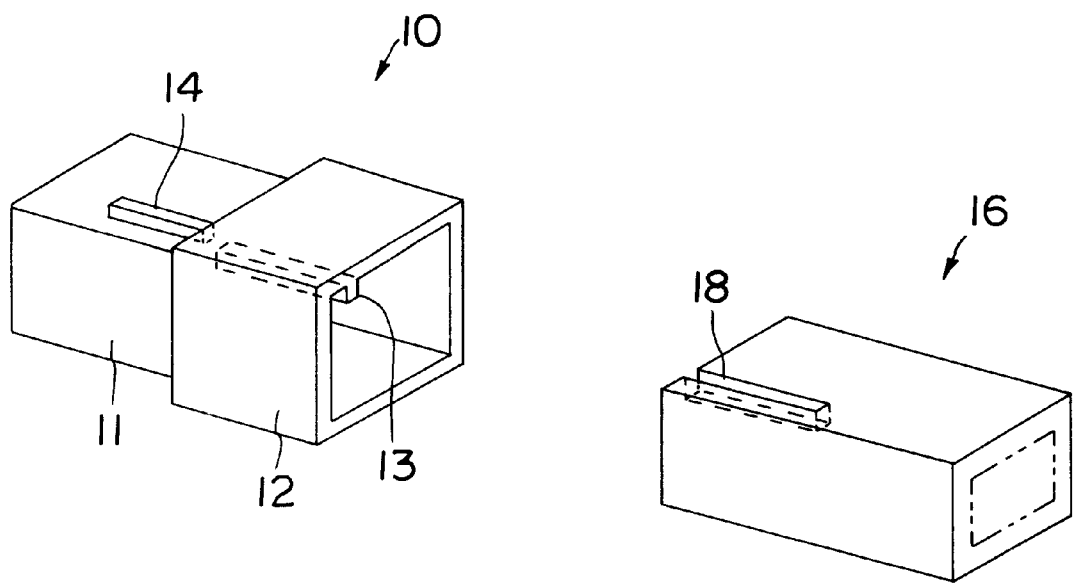
FIGS. 10(A) and 10(B) are perspective views of the first and second male connectors, respectively.
Figure 10B:
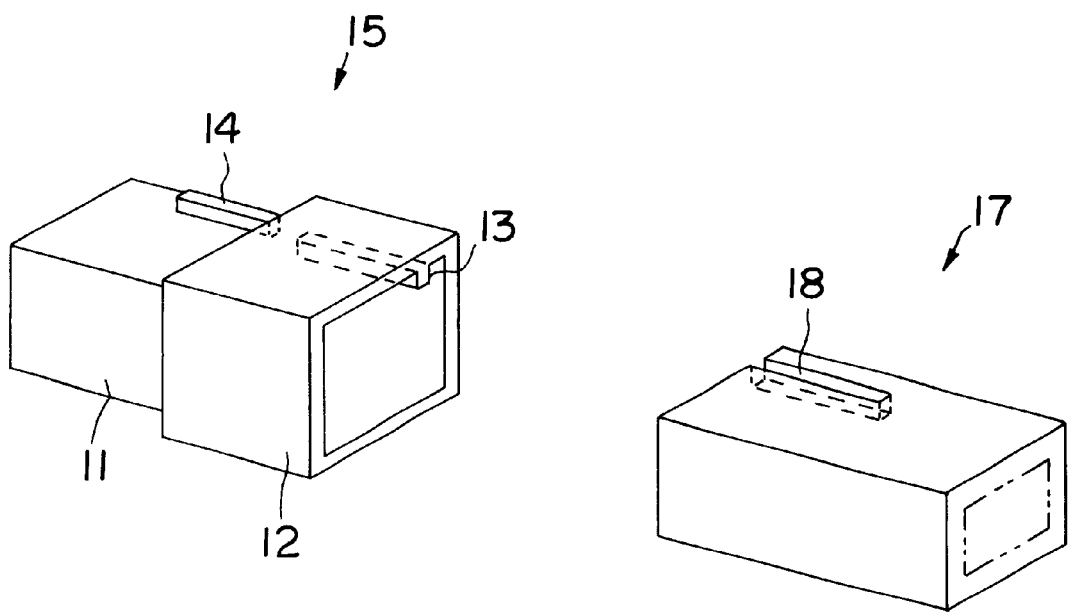
Figure 11A:
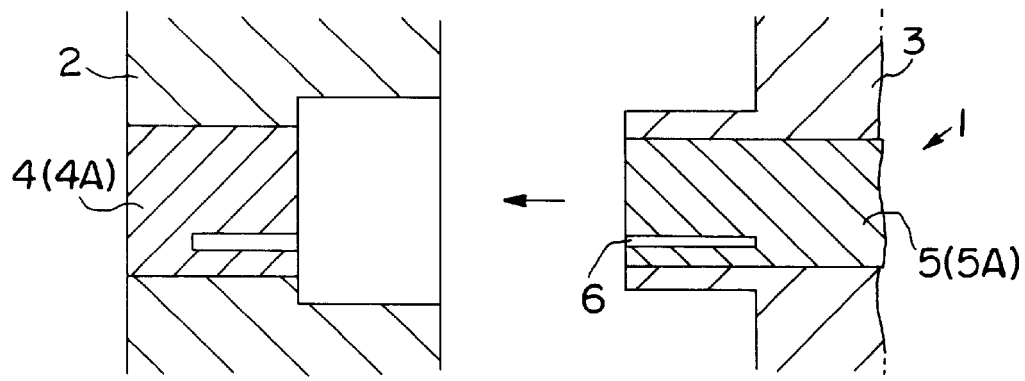
Figure 12:
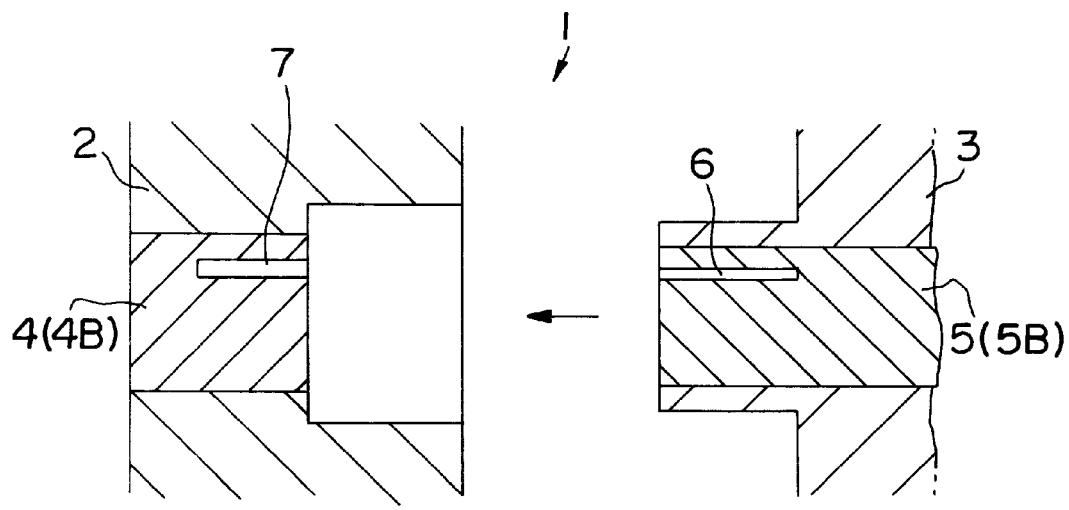
FIG. 12 is a plan view in section of the prior art connector mold having an insert mounted thereon.
Figure 13:
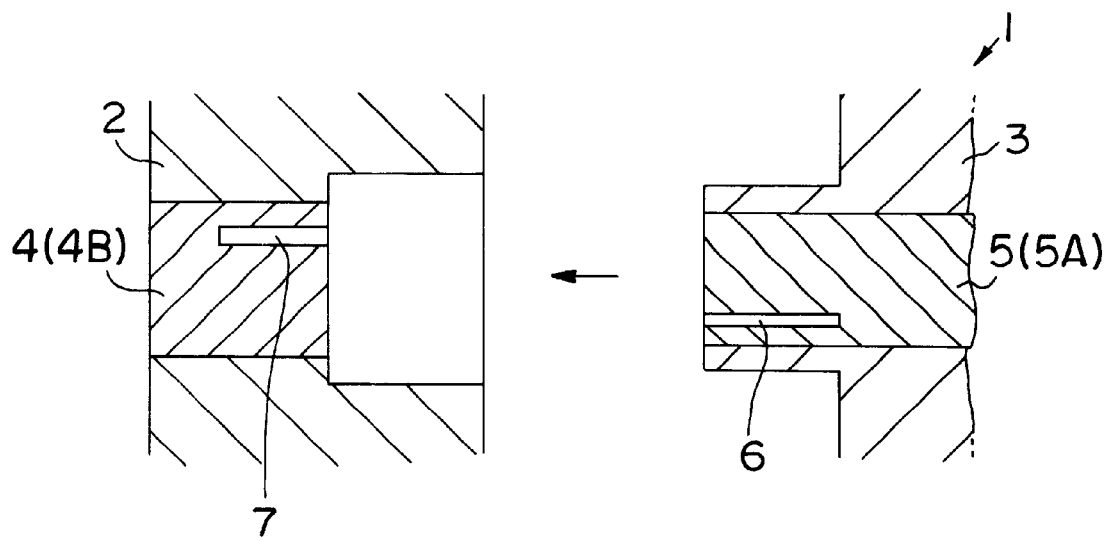
FIG. 13 is a plan view in section of the prior art connector mold having a wrong insert mounted thereon.

A connector mold according to a second embodiment molds a first male connector 41 shown in FIGS. 6 and 7 and a second male connector 42 shown in FIG. 8 by exchanging inserts.

The two connectors 41, 42 have a common basic construction comprised of a housing main body 43 and a receptacle 44. On the opposite sides of the upper inner surfaces of receptacles 44 of the respective connectors 41, 42 are formed a wide groove 45 and a narrow groove 46 having different widths and extending in a direction of connection. In the first male connector 41, the wide groove 45 and the narrow groove 46 are arranged on the left and right sides, respectively, when viewed from front as shown in FIG. 7(B). The grooves 45, 46 are in a reverse arrangement in the second male connector 42 (see FIG. 8(B)). Identification ribs 47 for identifying the connectors 41, 42 are formed on the extension lines of the narrow grooves 46 of the connectors 41, 42. The ribs 47 of the connectors 41, 42 are of the same shape.

A connector mold 50 according to this embodiment is shown in FIG. 9(A). In a fixed mold 51 of the connector mold 50 shown at the left side of FIG. 9(A), a pair of forming grooves 52 extend on the opposite sides in parallel to the opening and closing direction of the mold 50. In a movable mold 53 shown at the right side of FIG. 9(A), a wide insert 54 for forming the wide groove 45 and a narrow insert 55 for forming the narrow groove 46 are exchangeably mountable on the extension lines of the forming grooves 52. A closing projection 56 fittable into the forming groove 52 projects from the front surface of the wide insert 54.

The other construction is same as the first embodiment and, accordingly, repetitive description is not given here.

The first male connector 41 is molded as follows. After the wide insert 54 is mounted at the lower side of the movable mold 53 and the narrow insert 55 is mounted at the upper side as shown in FIG. 9(A), the connector mold 50 is closed. Then, as shown in FIG. 9(B), the closing projection 56 of the wide insert 54 is fitted into the one forming groove 52 formed in the fixed mold 51. When synthetic resin is injected, it flows into the other forming groove 52, with the result that the identification rib 47 is formed at the right side of the upper surface of the connector when viewed from front as shown in FIG. 7(A). As shown in FIG. 7(B), the wide groove 45 and the narrow groove 46 are formed on the left and right sides by the inserts 54, 55, respectively, when viewed from front.

To mold the second male connector 42, the inserts 54, 55 may be exchanged with each other in a state for molding the first male connector 41.

The connector mold 50 according to this embodiment can ensure the same action and effects as the first embodiment. The present invention is not limited to the described and illustrated embodiment, but the following embodiments are also embraced by the technical scope of the present invention as defined in the claims. Besides the following embodiments, a variety of other changes can be made without departing from the scope and spirit of the invention as defined in the claims. Although the connectors according to the foregoing embodiments are male connectors, it does not matter whether the invention is applied to a male or female connector provided that the connector is provided with a receptacle. Although two kinds of connectors are molded by preparing two kinds of inserts in the first embodiment, two or more kinds of connectors may be molded by increasing the number of kinds of inserts and the number of recesses (identification rib forming grooves).

What is claimed is:

1. A connector mold for molding a plurality of kinds of connectors, each said connector having opposed front and rear ends, an outer surface and a receptacle extending into said front end, an error assembling preventing portion being provided in the receptacle, the error assembling preventing portion of at least one of said kinds of connectors being different from the error assembling preventing portion of at least one other of said kinds of connectors for preventing connection with an improper mating connector, each said connector further comprising an identification projection arranged on the outer surface of the connector rearwardly of the receptacle for identifying the error assembling preventing portion thereof, the connector mold comprising:

a first mold main body with at least one recess configured for forming the outer surface of each of said connectors, said first mold main body being formed with a plurality of identification rib-forming grooves disposed for forming the identification projections on each of said kinds of connectors;

a second mold main body configured for covering at least a portion of said first mold main body and for forming at least the front end of each said connector, the second mold main body being formed with an insert mount portion for receiving an insert therein; and a plurality of inserts, each of which is selectively mountable in the insert mount portion of the second mold main body, each said insert having a preventing portion for forming the error assembling preventing portion, the preventing portion being aligned with a selected one of said identification rib-forming grooves of the first mold main body for forming the error assembling preventing portion on the selected kind of said connectors, each of said inserts further being provided with at least one closing projection for closing each of said identification rib-forming grooves in the first main mold body except for the identification rib-forming groove aligned with the preventing portion of the insert for forming the error assembling preventing portion, whereby each said connector formed by the mold has an error assembly preventing portion and an identification projection aligned with one another.

2. A connector mold according to claim 1, wherein the at least one recess in the first mold main body comprises at least one stepped recess having a cross-sectionally large portion configured for forming the outer surface of said connector surrounding said receptacle, and a cross-sectionally smaller portion for forming portions of said outer surface rearwardly of the receptacle, the identification rib-forming groove being disposed on the cross-sectionally smaller portion of the recess in the first mold main body.

3. A connector mold according to claim 1, wherein the identification rib-forming groove extends outwardly from the recess in the first mold main body, and wherein the preventing portion of the insert is a rib-forming groove that projects inwardly on the respective insert.

4. A connector mold according to claim 1, wherein the identification rib-forming groves are substantially parallel to the preventing portion when the inserts are inserted into the recess of the first mold main body.

5. A connector mold according to claim 1, wherein the closing projection is an elongate projection extending substantially parallel to the preventing portion on the respective insert.

6. A connector mold for molding two kinds of connectors, each said connector having opposed front and rear ends, an outer surface and a receptacle extending into said front end, an error assembling preventing groove being provided in the receptacle, the error assembling preventing groove of one of said kinds of connectors being different from the error assembling preventing groove of the one other of said kinds of connectors for preventing connection with an improper mating connector, each said connector further comprising an identification rib arranged on the outer surface of the connector rearwardly of the receptacle for identifying the location of the error assembling preventing groove thereof, the connector mold comprising:

a first mold body with at least one recess configured for forming the outer surface of each of said connectors, said first mold body being formed with two identification rib-forming grooves disposed for forming the identification ribs on each of said kinds of connectors;

a second mold main body configured for covering at least a portion of said first mold body and for forming at least the receptacle of each said connector, the second mold main body being formed with insert mount portions for receiving inserts therein; and first and second inserts, each of which is selectively mountable in the insert mount portions of the second mold main body, said first insert having a preventing rib for forming the error assembling preventing groove, the preventing rib being aligned with a selected one of said identification rib-forming grooves of the first mold for forming the error assembling preventing groove in the receptacle on the selected kind of connector at a location aligned with the identification rib of the selected kind of connector, the second insert being provided with a closing projection for closing the other of said identification rib-forming grooves in the first mold body, whereby each said connector formed by the connector mold has only one identification rib and has the identification rib aligned with the error assembly preventing groove.

* * * * *